United States Patent [19]

Wallace

[11] Patent Number: 5,481,548
[45] Date of Patent: Jan. 2, 1996

[54] TECHNIQUE FOR DIAGNOSING AND LOCATING PHYSICAL AND LOGICAL FAULTS IN DATA TRANSMISSION SYSTEMS

[75] Inventor: J. Lightsey Wallace, Fairfax Station, Va.

[73] Assignee: Hekimian Laboratories, Inc., Rockville, Md.

[21] Appl. No.: 284,849

[22] Filed: Aug. 2, 1994

Related U.S. Application Data

[62] Division of Ser. No. 682,974, Apr. 9, 1991, Pat. No. 5,375,126.

[51] Int. Cl.⁶ .................................................. G06F 11/00
[52] U.S. Cl. ............................................ 371/20.1; 371/5.1
[58] Field of Search ............................. 371/20.1, 15.1, 371/5.1, 29.1; 235/92

[56] References Cited

U.S. PATENT DOCUMENTS

| | | |
|---|---|---|
| 3,826,908 | 7/1974 | Weathers et al. . |
| 3,891,838 | 6/1975 | Herr et al. . |
| 3,924,078 | 12/1975 | Bussey . |
| 4,070,647 | 1/1978 | Robson ........................ 340/146.1 A X |
| 4,546,467 | 10/1985 | Yamamoto . |
| 4,750,175 | 6/1988 | Brenneman et al. . |
| 4,792,753 | 12/1988 | Iwai . |
| 4,817,092 | 3/1989 | Denny . |
| 4,873,687 | 10/1989 | Breu . |
| 4,881,230 | 11/1989 | Clark et al. . |
| 4,990,817 | 2/1991 | Turner ....................................... 370/17 |
| 5,027,343 | 6/1991 | Chan et al. . |
| 5,036,514 | 7/1991 | Downes et al. .......................... 371/51 |

FOREIGN PATENT DOCUMENTS

0332286  9/1989  European Pat. Off. .

OTHER PUBLICATIONS

"HP 3787B Digital Data Test Set," printed Jan. 1988, by Hewlett Packard.

"Centralized Testing Gives IXC a Competitive Advantage," Telephony, Feb. 5, 1990, by A. Skaggs et al.

"LM1™ Olympic Edition PC–based Protocol Analyzer," Progressive Computing, Inc., May 1990, pp. 1—1 through 1–7, and E–1 through E–5.

Primary Examiner—Robert W. Beausoliel, Jr.
Assistant Examiner—Phung My Chung
Attorney, Agent, or Firm—Brumbaugh, Graves, Donohue & Raymond

[57] ABSTRACT

A system for testing circuits of digital data telecommunications networks provides selected physical and protocol testing on an integrated basis. Systems and test methods provide for analysis of test results to provide diagnosis of probable cause of actual or apparent faults related to data transmission and may also provide automatic implementation of additional diagnosis, followed by a second level of fault diagnosis using the additional test results. Display screens provide the results of fault analysis, provide comparative viewing of fault-free benchmark data and provide suggestions as to probable cause of faults. A central test unit portion of the system may be installed at a carrier's offices and testing may be controlled on a dial-up basis over telephone lines from a remote customer location using a personal computer as the test selection entry and information screen viewing device.

7 Claims, 7 Drawing Sheets

Microfiche Appendix Included
(1 Microfiche, 79 Pages)

DDS ACCEPTANCE LIMIT DATABASE

MASK:

PRIMARY CHANNEL            SECONDARY CHANNEL

TEST TIME:                              :    :                      :    :
BIT ERRORS COUNT:                       ^                           ^
BIT ERROR RATIO:                        . E-                        . E-
ERRORED SECS:                           ^                           ^
% ERROR FREE SECS:                      . v                         . v
PATTERN SYNC LOSS SECS:                 ^                           ^
PATTERN RESYNCS:                        ^                           ^
SUBRATE FRAMING ERRORS:                 ^                           ^
BIPOLAR VIOLATIONS:                     ^                           ^
DS1 FRAMING ERRORS:                     ^
DS1 SYNC LOSS SECS:                     ^
DS1 RESYNCS:  SECS:                     ^
CRC-6 ERROR COUNT:                      ^

ARE YOU SURE ?:

F1-AHEAD, F2-BACK, F3-FIRST, F4-HELP, F5-TOP, F6-BOTTOM, F7-DELETE, F8-EXIT

FIG. 2

| PROTOCOL VITAL SIGNS—TREND | | | | | | |
|---|---|---|---|---|---|---|
| (CIRCUIT NUMBER)   ACCESS NUMBER: 1 | | | | | | |
| | A TOWARD Z | | | Z TOWARD A | | |
| MEASUREMENT | BENCH 1990 NOV 12 | LAST 1991 FEB 4 | NOW 1991 FEB 4 | BENCH 1990 NOV 12 | LAST 1991 FEB 4 | NOW 1991 FEB 4 |
| PROTOCOL TYPE | SNA | SNA | SNA | SNA | SNA | SNA |
| IDLE CIRCUIT PCT | 96 | 64 | 64 | 94 | 80 | 80 |
| MESSAGE ERRORS | 0 | 0 | 0 | 0 | 0 | 0 |
| ACTIVE LEGS | 2 | 3 | 3 | 1 | 1 | 1 |
| ACTIVE STATIONS | 10 | 30 | 30 | 2 | 2 | 2 |
| AVG MESSAGE SIZE | 25 | 135 | 137 | 25 | 165 | 156 |
| CONTROL MSG-FACTOR | 0 | 1 | 1 | 0 | 2 | 2 |
| SAMPLE DURATION | 63 | 80 | 63 | 63 | 80 | 63 |
| MSG COUNT | 121 | 256 | 199 | 183 | 119 | 98 |
| 1-TREND  2-SYSTEM  3-LEGS  4-STATIONS  5-DOWN  6-UP 7-SUGGESTION  8-STOP  9-HOLD | | | | | | |

FIG. 3

| PVS—SYSTEM ANALYSIS | | |
|---|---|---|
| (CIRCUIT NUMBER)   ACCESS NUMBER: 1 | | |
| LINK ANALYSIS | A TOWARD Z | Z TOWARD A |
| LINK SETUP REQUESTS | 0 | 0 |
| LINK REJECTS (REJ) | 0 | 0 |
| FRAME REJECTS (FRMR) | 0 | 0 |
| MESSAGE SIZE-MAXIMUM | 13 | 13 |
| LINK WINDOW SIZE | 8 | 8 |
| PACKET ANALYSIS | | |
| LPDA FRAME COUNT | 0 | 0 |
| FID TYPE | 3 | 3 |
| ACTIVE SESSION COUNT | 0 | 0 |
| BIND REQUESTS | 0 | 0 |
| 1-TREND  2-SYSTEM  3-LEGS  4-STATIONS  5-DOWN  6-UP 7-SUGGESTION  8-STOP  9-HOLD | | |

FIG. 4

| PVS -- LEG ANALYSIS | | | | | | |
|---|---|---|---|---|---|---|
| (CIRCUIT NUMBER) ACCESS NUMBER: 1 | | | | | | |
| PRIMARY LEG: 3 | | | | | | PAGE 1 OF 1 |
| LEG | MSGS FROM A | BAD | REJECTS | MSGS TO A | BAD | REJECTS |
| ALL | 269 | 0 | 0 | 475 | 32 | 31 |
| c1 | 159 | 0 | 0 | 307 | 32 | 31 |
| c3 | 54 | 0 | 0 | 59 | 0 | 0 |
| c8 | 56 | 0 | 0 | 109 | 0 | 0 |
| 1-TREND  2-SYSTEM  3-LEGS  4-STATIONS  5-DOWN  6-UP  7-SUGGESTION  8-STOP  9-HOLD | | | | | | |

FIG. 5

| PVS -- STATION ANALYSIS | | | | | | |
|---|---|---|---|---|---|---|
| (CIRCUIT NUMBER) ACCESS NUMBER: 1 | | | | | | |
| TOTAL STATIONS: 3 | | | | | | PAGE 1 OF 1 |
| LEG | MSGS FROM A | BAD | REJECTS | MSGS TO A | BAD | REJECTS |
| c1 | 159 | 0 | 0 | 307 | 32 | 31 |
| STATION | | | | | | |
| 33 | 78 | 0 | 0 | 40 | 0 | 0 |
| 53 | 35 | 0 | 0 | 207 | 32 | 31 |
| 13 | 46 | 0 | 0 | 60 | 0 | 0 |
| 1-TREND  2-SYSTEM  3-LEGS  4-STATIONS  5-DOWN  6-UP  7-SUGGESTION  8-STOP  9-HOLD | | | | | | |

FIG. 6

LEG ANALYSIS SUGGESTION   SNA

LOGICAL CIRCUIT DESCRIPTION
  MULTIPOINT CIRCUIT WITH ACCESS AT THE MASTER LEG
  6 ACTIVE LEGS AND 47 ACTIVE USERS

OBSERVATIONS
  USER ERROR FREE MESSAGE RATE IS 92.97%

PROBABILITY OF NETWORK FAULT IS 75%

SIMILAR ERROR RATE ON 4 LEGS INDICATES HIGH
  PROBABILITY OF MJU PROBLEM

SUGGESTIONS
  1. CHECK MJU CONFIGURATION
  2. RUN PVS TEST ON EACH LEG OF THE MJU. IF ALL
     LEGS ON A SPECIFIC MJU CONTAIN SIMILAR AMOUNT
     OF ERRORS, PERFORM FULL MJU DIAGNOSTICS
  3. VERIFY OPERATION OF ALL MJUS

FIG. 7

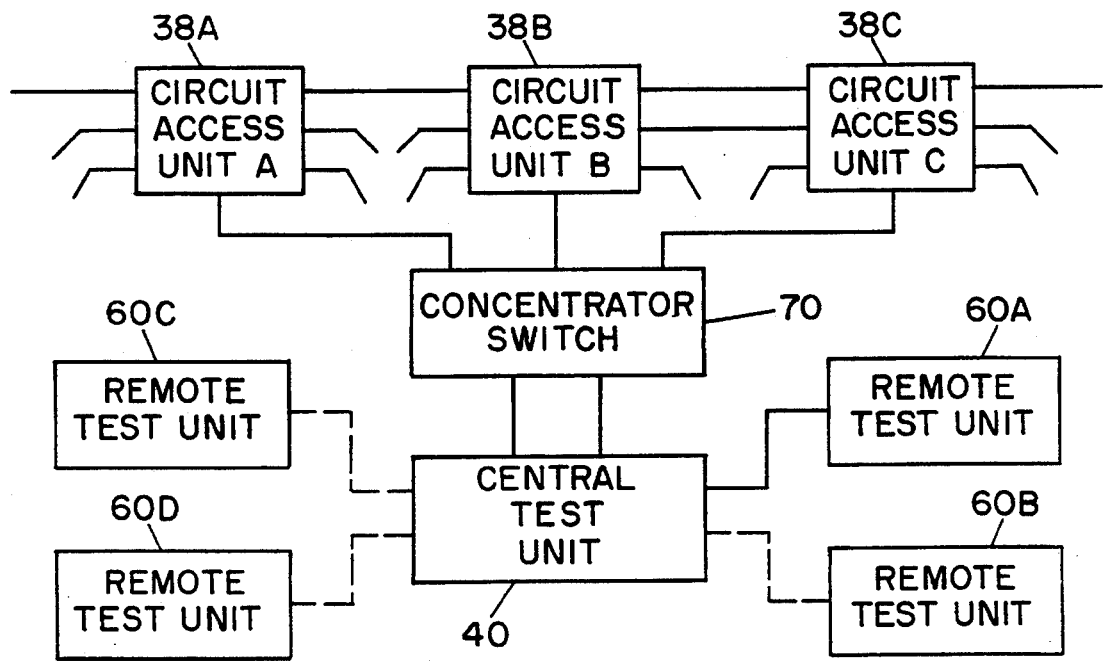

FIG. 8

STRESS TEST NO. 2

HDLC, SDLC, SNA, X.25 (BIT ORIENTED PROTOCOLS)

```
                                   "FLAG"              "FLAG"
       FF   FF   FF   FF            7E                  7E
-11111111 1111111 1111111 1111111 01111110 [MESSAGE] 01111110 1111111 1111111 1111111 1111111 -
———IDLE———                                                          ———IDLE———
```

STRESS TEST NO. 3

IBM BISYNC = 2 SYNCS

```
                                  "SYNC" "SYNC"
       FF   FF   FF   FF            32     32                    FF    FF    FF
-11111111 1111111 1111111 1111111 00100010 00100010 [MESSAGE] 11111111 1111111 1111111 -
———IDLE———                                                              ———IDLE———
```

FIG. 9

TECHNIQUE FOR DIAGNOSING AND LOCATING PHYSICAL AND LOGICAL FAULTS IN DATA TRANSMISSION SYSTEMS

This application is a division of application Ser. No. 07/682,974, filed on Apr. 9, 1991 now U.S. Pat. No. 5,375,126.

SPECIFICATION

A microfiche appendix containing 79 frames on one card is included in this specification and is hereafter referred to as Appendix I.

BACKGROUND OF THE INVENTION

The present invention relates generally to testing of data transmission circuits of digital telecommunications systems and testing of protocols associated with digital data carried on such circuits. More particularly, the invention relates to systems and methods permitting both physical and logical testing of data circuits in one test system and enabling diagnosis of probable cause of faults based on results of both physical and logical tests.

Digital data is transmitted over complex telecommunications systems operated by carriers which provide circuits coupled to individual customer's facilities. At their facilities, customers connect data terminals and other equipment at various stations to permit the transmission of data to geographically separated points. When a problem is experienced in the transmission of data from station A to station Z, from station Z to station A, or in both directions between stations A and Z, the problem can be caused by a physical fault in the transmission circuit, a logical fault in the protocols used in the transmission of data, or possibly by a combination of physical and logical faults.

This differentiation between physical and logical faults should be carefully noted. A physical fault represents a physical inability of a circuit to properly transmit data between the desired stations. A logical fault represents a defect relating to the protocol used to control the transmission of data between the desired stations. A "protocol" is a defined set of rules or coding format for transmission of information between desired stations. Many forms of standard and specialized protocols typically address the same functions, including data framing, error detection, error correction, multi-point polling, addressing and flow control. If the protocol is not properly implemented and interpreted data cannot be accurately transmitted over a digital telecommunications network. Thus, while a transmission fault will physically interfere with transmission of data, a protocol fault will also interfere with data transmission, even in the absence of a physical circuit fault.

Typically, when a customer experiences a problem in transmitting data between two stations, the customer has had no effective way of determining whether there is a physical transmission problem on the carrier-supplied circuit, or whether there is a protocol processing problem at the sending station or receiving station, for example. As a result, the circuit could remain inoperative while the customer complained to the carrier and the carrier carried out physical transmission testing of the circuit. Then, if the carrier found no fault, the customer could be forced to contact the vendors of equipment used at different stations which might be involved in causing a protocol fault. Additional time could be consumed while the equipment vendors addressed the source of the problem, so that the fault could be finally located and fixed. Thus, there has been a continuing need for practical and effective means for customers to locate faults affecting the transmission of data between stations, without dependence on carriers, equipment vendors, or both.

At the carrier level, there are test systems available which permit effective physical testing of digital data transmission circuits. A prime example is the REACT 2000 Operations Support System developed and marketed by Hekimian Laboratories, Inc., the assignee of the present inventor. These systems are used by technical personnel of the carrier to identify transmission faults caused by defects in the transmission circuits. At the present time, however, these personnel have typically not been experienced or qualified in the identification of protocol faults, since such faults do not basically relate to the transmission system provided by the carrier, but relate instead to the customer's use of the circuit provided by the carrier.

With respect to protocol testing, there is protocol test equipment available which permits effective testing of respective digital protocols associated with the transmission of data between stations over a particular transmission circuit. The technical personnel qualified in the use of such protocol test equipment are normally different individuals than those qualified in physical transmission testing. As a result, two different technicians using two different pieces of test equipment are commonly needed to locate faults. In addition, the respective tests are typically carried out at two different locations, i.e., transmission tests at the carrier's facility and protocol tests at the customer's facility.

Certain patents provide background to the present invention. U.S. Pat. No. 4,792,753 describes a local area network protocol analyzer which performs statistical analysis of the traffic loading of the network under test. The generation and display of certain message traffic characteristics are addressed. U.S. Pat. No. 3,826,908 describes a prior art type data telecommunications analyzer for performing protocol analysis on a stand-alone basis at a customer site. U.S. Pat. No. 4,750,175 describes a data processing network test system for diagnosing malfunctions in a network, network components or software through protocol analysis. Analysis is performed by a remote central computer receiving modified data packets from test computers at local data processing sites which receive data packets detected at probe locations at the local sites. The data packets are detected and modified before transmission to the central computer to maintain message privacy during protocol analysis. U.S. Pat. Nos. 4,817,092; 4,873,687 and 4,881,230 describe the use of expert systems for detecting and analyzing equipment failure in a multiplex digital communication system and alerting the operator as to remedial action if corrective action cannot be implemented automatically.

While these prior patents, and certain prior equipment which will be referred to in describing the invention, represent available approaches to fault identification, they have not provided solutions to the problems discussed above. Specifically, no solution is provided to enable analysis of transmission and protocol problems on an integrated, customer-accessible basis, and the additional benefits thereby made possible in accordance with the present invention are not suggested.

So far as the applicant is aware, there has not been available any integrated test system capable of operation at either a central or remote location, by a single individual, to permit identification of digital data circuit faults in the nature of either transmission faults or protocol faults and diagnosis of problems. It should also be pointed out that certain types of faults may be more readily identified as one type of fault in view of the results of other types of tests. For example, the results of certain protocol testing may aid in the diagnosis of physical faults and vice versa. However, in the absence of an integrated physical/protocol capable test system as herein described, the benefits of such interactive testing have not been obtainable.

It is therefore an object of the present invention to provide improved systems and methods for testing digital data transmission circuits which provide combined capabilities of transmission and protocol testing.

It is a further object of the invention to provide such test systems and methods enabling the diagnosis of faults based on the results of selected transmission and/or protocol testing of selected transmission circuits, and such test systems adapted to provide to the user suggestions as to probable cause of faults based on analysis of such results of selected transmission and/or protocol testing. It is also an object to provide such systems and methods whereby the results of such analysis are automatically used to determine the desirability of, and to appropriately cause the performance of, additional tests whose results are then used for performing additional fault analysis.

It is a further object of the invention to provide such test systems and methods enabling the recording and retention of benchmark test data representing acceptable operation of a transmission circuit and subsequent use of such benchmark data in the diagnosis of faults.

It is an additional object of the invention to provide transmission circuit test systems and methods which may be remotely accessed and controlled via a terminal at a customer facility, to permit selection, implementation and evaluation of transmission and/or protocol testing directly by customer personnel.

SUMMARY OF THE INVENTION

In accordance with the invention, a system for testing digital data transmission circuits, comprises a central test system and second test means. The central test system includes coupling means for providing access to one or more circuits to be tested, transmission test means for performing selectable transmission tests on the circuits to be tested to provide transmission test data and protocol test means for performing selectable tests of respective digital protocols associated with digital data carried by the circuits to be tested to provide protocol test data. The central test system also includes operations support means for enabling selection of the one or more circuits to be tested and selection of transmission and protocol tests to be performed on those circuits and memory means for storing statistical data relating to the transmission of data on the circuits to be tested. The central test system further includes analysis means, coupled to the protocol test means and the operations support means, for selectively analyzing the protocol test data, the transmission test data and the statistical data, for deriving information indicative of the presence of transmission and/or protocol faults, including diagnosis of probable cause or causes of actual or apparent faults related to data transmission on the circuits to be tested. The second test means includes control means, adapted to be coupled to the operations support means of the central test system, for selecting the one or more circuits to be tested and for causing the central test system to perform selected transmission and/or protocol tests with respect to such one or more circuits and carry out selected analysis to derive information indicative of faults and diagnoses of probable cause of such faults and display means for displaying information indicative of faults and diagnoses of probable cause of such faults, including comparative presentation of information based on stored statistical data, to permit viewing of information indicative of faults, comparative statistical data and diagnoses of probable cause.

A method for performing locally and/or remotely accessible testing of a digital telecommunications system having a plurality of digital transmission circuits, comprises the steps of:

(a) providing access to one or more selected circuits of the telecommunications system;

(b) performing selectable tests of respective digital protocols associated with digital data carried by one or more selected circuits and/or transmission tests on one or more selected circuits;

(c) storing statistical data based on results of step (b) and/or previous tests relating to such one or more selected circuits;

(d) accessing stored decision trees and/or rules and stored fault analysis procedures useful for identifying and analyzing faults affecting data circuits, including rule and procedure steps for selecting additional testing and/or analysis;

(e) analyzing the results of step (b) selectively using test data stored in step (c) by traversing in a predetermined manner selected items of the decision trees and/or rules and fault analysis procedures to derive information indicative of possible faults affecting said one or more selected circuits including diagnosis of probable cause or causes of actual or apparent faults related to data transmission on such one or more circuits;

(f) determining, based on analysis and diagnosis carried out in step (e), whether additional protocol and/or transmission tests are appropriate and causing repetition of step (b) to perform any such additional tests to provide additional test results;

(g) repeating step (e) as necessary to utilize the additional test results;

(h) providing the information derived in step (e), including any repetition thereof, for use at a local and/or remote location;

(i) displaying at the local and/or remote location information indicative of faults and diagnoses of probable cause of such faults; and (j) permitting selection at the local and/or remote location of specific circuits to be addressed by steps (a) through (i).

Methods for deriving benchmark profiles and a User Error Free Message percentage in accordance with the invention are also described.

For a better understanding of the present invention, together with other and further objects thereof, reference is made to the following description, taken in conjunction with the accompanying drawings, and its scope will be pointed out in the appended claims.

BRIEF DESCRIPTION OF THE DRAWINGS

FIG. 2 shows a computer screen format for displaying test data based on physical testing of a circuit.

FIGS. 3, 4, 5 and 6 show computer screen formats for respectively displaying trend data, system analysis data, leg analysis data and station analysis data derived in accordance with the invention.

FIG. 7 shows a computer screen format for displaying suggestion information relating to diagnosis of faults derived in accordance with the invention.

FIG. 8 is a block diagram of a test system in accordance with the invention used in a different overall test configuration.

FIG. 9 shows the digital data make-up of two stress tests used to test transmission circuits.

DESCRIPTION OF THE INVENTION

Figure 1:
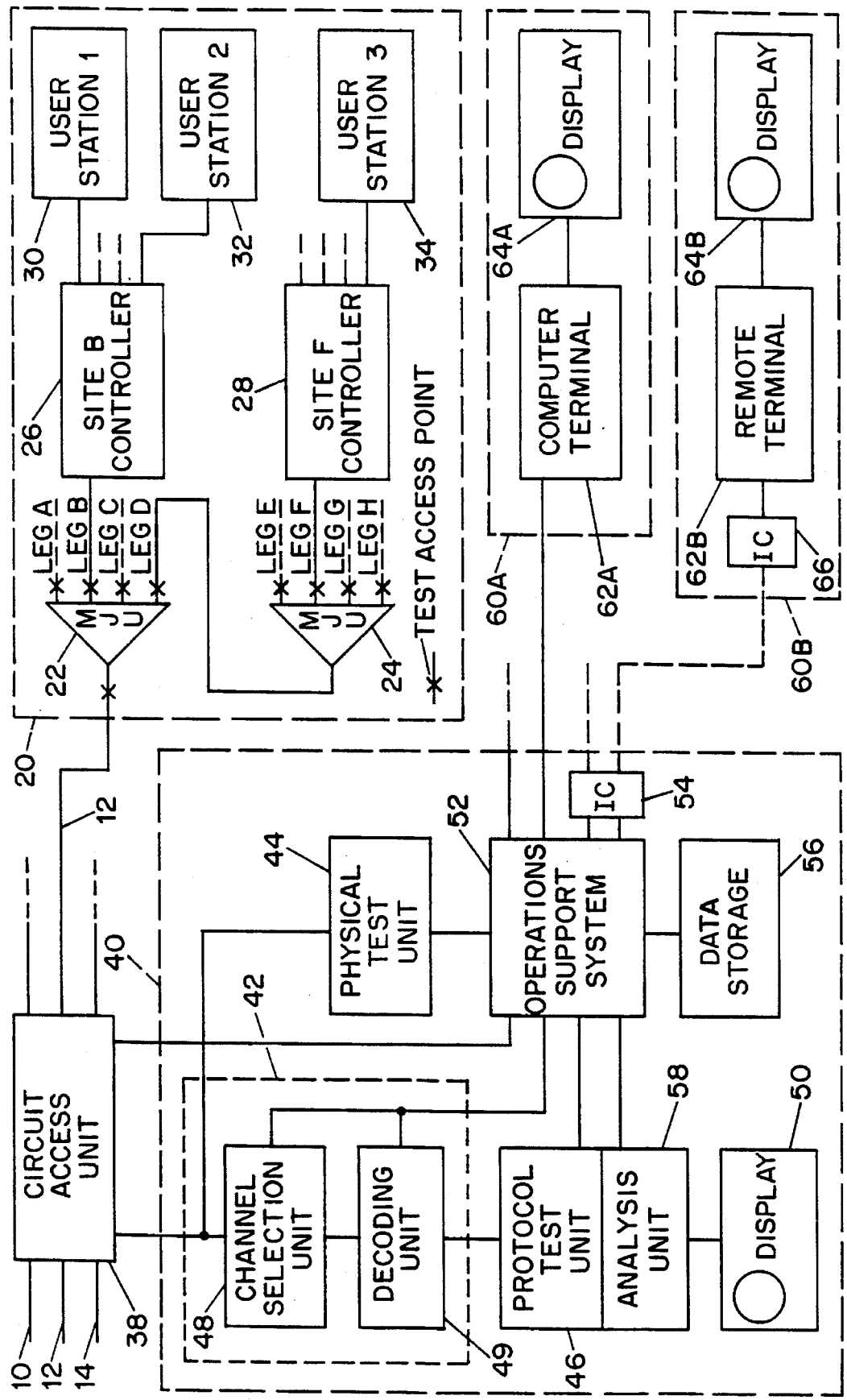
FIG. 1 is a block diagram of a test system in accordance with the invention for testing transmission circuits of digital data telecommunications networks.

Referring now to FIG. 1, there is shown a system for testing digital data transmission circuits in accordance with the invention. In FIG. 1, a digital telecommunications system is represented by three data transmission circuits, 10, 12 and 14, which are parts of a system provided as a service by a carrier company, with one circuit 12 shown entering a customer network facility 20. As shown in this example, circuit 12 connects to multiple junction unit (MJU) circuit 22 which divides the circuit into four legs A–D, with leg D connecting so a second multiple junction unit 24, which also divides the circuit into four legs F-H. Via legs C and F, the multiple junction units are respectively coupled to site controllers 26 and 28, which provide connections to individual user stations, such as stations 30, 32 and 34, which may be computer terminals or other equipment used in the transmission and/or reception of data. It will be appreciated that additional customer network facilities similar to facility 20 can be connected to the right-hand ends of the remaining circuits 10 and 14, and also to the left-hand ends of all three of the circuits 10, 12 and 14. In this way, a terminal connected at station 1, shown at 30, can be arranged to transmit data to and receive data from a terminal connected to a station on the other side of the country or at any other location.

In FIG. 1, circuit access unit 38 is shown coupled to the circuits 10, 12 and 14. Unit 38, which may be a Hekimian digital test access unit, model DTAU, or any one of a number of other digital cross connect systems, such as the AT&T model DACS1, is designed to permit access to any one or more of the individual circuits in the digital telecommunications system. Access by way of the digital cross connect unit 38 may be on a non-intrusive basis, whereby access is provided without disturbing data transmission traffic on a circuit, or on an intrusive basis, whereby a circuit is removed from customer use in order to permit testing.

The test system shown in FIG. 1 includes a central test system 40, which provides the central functions of the test system, as will be described, and which is typically located at the carrier's facility. The test system shown also includes two variations of second test means shown as units 60A and 60B. Unit 60A is shown directly connected to central test system 40, as would be suitable with unit 60A co-located at the carrier's facility, and unit 60B is shown selectively coupled over telephone lines via modems, as would be suitable for remote location of units 60B at a customer's facility. As will be explained, the present invention permits a single central test unit 40 to be put in place at the carrier's facility and selectively utilized by a remote unit 60B at any customer's facility. In this way, any customer having access to the carrier's main telecommunications system, as represented by circuits 10, 12 and 14, from any location throughout the country can carry out transmission and/or logical testing of the circuits used by the customer on a time-shared basis over normal telephone lines. Depending on the actual volume of usage, a carrier may actually put in place a plurality of central test units 40, but the capability of permitting testing by a large number of individual customers, with only very limited duplication of test equipment, will still be dramatically achieved.

Considering now central test system 40 of the FIG. 1 test system, it includes coupling means, shown as coupling unit 42, for providing access to one or more circuits to be tested. As shown, coupling unit 42 provides access via connection to the circuit access unit 38, coupled to the circuits 10, 12 and 14.

Unit 40 includes transmission test means, shown as physical test unit 44 coupled to unit 42, for performing selectable transmission tests in one or more circuits in order to provide transmission test data. Physical test unit 44 may be a Hekimian model 6302 DDS Test Unit or other available test unit, such as a Hewlett Packard model 3787B Digital Data Test Set. Transmission test means 44 is thus capable of selectively providing a wide range and variety of physical tests on one or more circuits, such as circuit 12, in known manner in order to provide transmission test data indicative of the presence or absence of physical faults on the circuit 12.

As shown, unit 40 further includes protocol test means, shown as protocol test unit 46, for performing selectable tests of respective digital protocols associated with digital data carried by one or more circuits, such as circuit 12, to be tested in order to provide protocol test data. Various forms of protocol analyzers are available for this purpose and protocol test unit 46 may be provided in the form of Progressive Computing, Inc., model LM1 Olympic Edition PC-based protocol analyzer operating on a personal computer equipped for at least. DOS 3.3 level operations. Thus, operationally, protocol test unit 46 in this example represents the LM1 protocol analyzer software utilizing a portion of the facilities of a computer terminal. Protocol test unit 46 is capable of selectively providing a wide range and variety of protocol tests on one or more circuits, such as circuit 12, in known manner in order to provide protocol test data indicative of the presence or absence of protocol faults affecting data travelling on the circuit 12.

In FIG. 1, protocol test unit 46 is coupled to access unit 38 via coupling unit 42, shown as including channel selection unit 48 and decoding unit 49. Channel selection means, shown as unit 48, is arranged for providing access to individual data transmission channels existing on circuit 12. Decoding means, shown as unit 49, is arranged for decoding subchannel encoding arrangements to provide access to such subchannels. The functions of units 48 and 49 may both be provided by a Hekimian Model 6302 channel selection and test unit, or other units of available equipment. A display unit 50 may optionally be provided as shown, may be included within the computer terminal of unit 46, or may be omitted as unnecessary in the case of operation utilizing the display included in unit 60A or unit 60B.

Central test system 40 in FIG. 1 also includes operations support means, shown as operations support system 52, for enabling selection of the one or more circuits to be tested and selection of transmission and protocol tests to be performed on the selected circuits by physical and protocol test units 44 and 46, respectively. Operations support system 52, shown coupled to each of units 38, 42, 44 and 46, is preferably a Hekimian model REACT 2000 Operations Support System, which is a highly capable and flexible system, enabling the control and selection of network testing, monitoring, management and administration. The REACT 2000 System, which is used at sites across the United States in the testing, accessing and monitoring of tens of thousands of circuits at transmission facilities operated by carriers and major companies, may be provided in the form of the Hekimian REACT 2000 software operating on a suitable computer, such as a Digital Equipment Company model VAX or MicroVax computer. In this form, the operations support system 52 is capable of covering substantially all aspects of transmission and protocol test implementation over a wide range of data rates, transmission standards, protocols and carrier and end-user equipment types. As shown, provision is made for coupling between system 52 and external second test means 60A and 60B by either direct coupling or via interconnection means, shown as IC unit 54, which may be a modem or other equipment for communicating data by telephone line, packet network or other suitable transmission arrangement.

Connected to operations support system 52 in FIG. 1 is memory means, shown as data storage unit 56, for storing statistical data relating to the transmission of data on one or more circuits to be tested. Data storage unit 56 may be any available type of data storage equipment suitable for the storage and retrieval of data relating to the transmission of data on selected circuits and transmission and protocol test data derived through current and earlier testing, including benchmark profile data to be described. The required data storage capacity will depend on the number of circuits subject to testing and the variety and extent of testing. A feature of the invention is the automated recording of benchmark profile data representing operation and message volume of selected circuits under acceptable operating conditions. Such data is then available in subsequent testing of the same circuits to permit comparisons under normal and problem conditions as an aid in support of fault diagnosis as will be discussed further. Obviously, if benchmark and later data is stored for hundreds of individual circuits and point to point transmissions, extensive data storage will need to be provided and can be implemented in accordance with appropriate industry standards. Benchmark data and the development of benchmark profiles are discussed below under the heading "Benchmark Profiles."

As illustrated in FIG. 1, central test system 40 of the test system includes analysis means, shown as analysis unit 58, for selectively analyzing protocol test data, transmission test data and stored statistical data to derive information indicative of the presence of transmission and/or protocol faults. As will be described further, analysis unit 58 provides the further capabilities of utilizing such data and analysis for purposes of diagnosis of probable cause or causes of actual or apparent faults related to data transmission on one or more circuits subject to test. As a result of these capabilities, the analysis unit 58 operating within the composite test system in accordance with the invention is enabled to provide suggestions as to the specific causes of problems being experienced on a circuit under test. Operationally, analysis unit 58 represents software with novel capabilities, provided in accordance with the invention, utilizing a portion of the facilities of the computer terminal described with reference to protocol test unit 46. Since, in this example, the protocol software and analysis software both operate on the computer terminal, but utilize the facilities of the terminal substantially independently, the protocol and analysis units 46 and 58 are shown adjacent to each other in FIG. 1.

In addition to (i) selectively analyzing such data for deriving information indicative of faults, including diagnosis of probable cause, analysis unit 58 may be arranged to provide the additional functions of (ii) using the results of such diagnosis to determine the desirability of, and to appropriately cause the performance of, additional transmission and/or protocol tests and (iii) performing additional diagnosis of probable cause or causes of actual or apparent faults through analysis of test data from such additional tests. In this way, test data resulting from a first level of tests is analyzed and, where diagnosis of faults includes an indication of the desirability of additional tests, additional tests are automatically carried out and the results analyzed by the test system.

Analysis unit 58 and its operations will be further described below. A source code listing of the current form of program provided for use in analysis unit 58 is included in Appendix I.

Referring now to units 60A and 60B in FIG. 1, there are illustrated two embodiments of the second test means portion of the complete test system. Second test means 60A includes control means, shown as computer terminal 62A, for selecting one or more circuits of the telecommunications system for testing and for causing the first test means 40 to perform selected transmission and/or protocol tests on the selected circuits and to carry out selected analysis to derive information indicative of faults and diagnoses of probable cause of such faults. As shown in FIG. 1, computer terminal 62A is coupled to operations support system 52 in central test system 40, and coupled through system 52 to analysis unit 58. With this arrangement, any one of a variety of types of available control units, data system monitoring equipment, compatible personal computers or other forms of computer terminals can be used for this purpose without requiring modification or any special software resident at the control means 62A. As will be described further, analysis unit 58, working with the operations support system 52, is effective to provide information, prompts and display screen formats to the terminal 62A to permit local control by the computer terminal operator of tasks including (a) selection of the specific circuits to be tested, (b) selection of transmission and/or protocol tests to be performed by unit 40, and (c) instructions for the carrying out of selected analysis to derive information indicative of faults and the presentation of diagnoses of probable cause of faults and suggestions as to conclusive action.

As shown, second test means 60A also includes display means, illustrated as display 64A, for displaying information indicative of faults and diagnoses of probable cause. Display 64A, which may be any suitable type of display device such as a monochrome or color cathode ray tube or solid state unit, provides the important function of permitting terminal operator interaction in the control and receipt of data from first test unit 40. In addition to permitting the review and selection of various control options, display 64A permits reviewing of resulting information indicative of faults and viewing and consideration of comparative statistical data and diagnoses of probable cause. Such comparative data based, for example, on current circuit performance displayed comparatively with the same data items recorded earlier and retrieved from storage can be a particularly effective tool in fault analysis.

In FIG. 1, computer terminal 62A is shown directly coupled to operations support system 52. The additional second test means 60B, including remote terminal 62B and display 64B which may be similar or identical to units 62A and 64A, is coupled to operations support system 52 via intercoupling means shown as intercoupling units 70 and 54. Intercoupling units 70 and 54, which must be compatible, may be modems arranged to communicate over normal telephone lines on a dial-up basis, or suitable packet network or other equipment capable of communicating data over dedicated or other lines or transmission circuits. In implementing remote operations, a remote access software package, such as pcANYWHERE provided by Dynamic Microprocessor Associates, Inc., may be used to enable remote access by personal computers of limited capabilities. Operations support system 52 is shown with four ports for communication with second test means represented by direct coupled unit 60A and selectively coupled remote unit 60B. It will be appreciated that while unit 60A may be at the same location as central test system 40, unit 60B may be remotely located at a customer facility thousands of miles distant. Also, while four ports are shown, operations support system 52 may be adapted to service a large number of local and remote test units like units 60A and 60B on a time-shared basis using known techniques for time-shared computer operations.

OPERATION OF THE FIG. 1 SYSTEM

As already noted, units 44, 46, 48, 50, 52, 54 and 56 may be provided in the form of available products combined in accordance with the invention. In particular, operations support system 52 is desirably implemented by use of the Hekimian REACT 2000 Operations Support System, which is a versatile system providing a wide range of capabilities applicable to monitoring telecommunication network performance and controlling network testing.

As an example of the relevant capabilities provided by the REACT 2000 System, it provides test result acceptance data bases for a variety of types of transmission circuits, including DS1, DDS, DSO, DSO subrate and DS3. These databases function as test result masks or display screen formats for each type of circuit testing. The databases are used in conjunction with a "SMARTEST" automatic testing feature, as well as with user-defined and normal mode testing. The user can record as many of these masks as needed, for reference when a SMARTEST is to be scheduled. When the scheduled SMARTEST is executed and obtains test results it refers to the mask indicated and test results representing a failed test are flagged into a FAILED category. In this way, SMARTEST can not only run tests automatically, but can interpret the results for the diagnosis of the cause or causes of physical faults on the transmission circuits under test.

As an example, following is a description of the test results acceptance database for DDS circuits, which is one of the circuit types referred to above. This description is in the form of operating instructions for use of the DDS database on the REACT 2000.

DDS Acceptance Database

The DDS Acceptance Database records pass/fail criteria for the testing of DDS circuits. FIG. 2 illustrates this data base.

The DDS Acceptance Database record includes mask entries for testing both the primary and secondary channels of a DDS circuit. This database includes the following entry fields:

MASK—Enter the name by which this mask will be known. Up to 20 characters.

TEST TIME—Duration of test given in hours, minutes and seconds. This time will be the default test length.
  Note: If you do not have a need for a test to report on a particular parameter, blank out the entry of that field. For example, if you are not interested in framing errors, space over the default 0 and leave that field blank.

BIT ERRORS COUNT—The maximum acceptable number of received data bits that do not agree with those transmitted from the test pattern generator.

BIT ERROR RATIO—The number of erroneous bits divided by the total number of bits transmitted during the length of the test. Enter the ratio in negative powers of ten.

ERRORED SECONDS—Seconds with the occurrence of a bipolar violation, bit error, framing bit errors (SF framing format only), frame slip, or loss of signal. Enter the maximum allowable number or such seconds.

% ERROR FREE SECONDS—The percentage of elapsed test seconds containing no error events. Enter the minimum acceptable percentage of error free seconds.

PATTERN SYNC LOSS SECS—Maximum acceptable number of seconds where the DSOB subrate framing pattern is in error.

PATTERN RESYNCS—The maximum acceptable number of times the receiver had to resynchronize on the test pattern.

SUBRATE FRAMING ERRORS—The number of framing bits from the DSOB signal that are in error. Enter the maximum allowable.

BIPOLAR VIOLATIONS—Indicates that the bit steam contained two consecutive bits of the same polarity. Enter the maximum number of BPVs to be allowed.

DSI FRAMING ERRORS—Enter the maximum allowable number of DSI framing errors.

DSI SYNC LOSS SECS—The maximum allowable number of seconds where the DSI framing synchronization is lost.

DSI RESYNCS: SECS—The maximum allowable number of seconds where the receiver had to resync on the DSI framing pattern.

CRC-6 ERROR COUNT—The maximum allowable number of ESF CRC-6 errors.

This description of the DDS Acceptance database provides an example of operating the FIG. 1 test system in a basic transmission test mode.

The remaining unit in first test means 40 is analysis unit 58, which enables additional capabilities including integrated transmission and protocol testing, diagnosis of probable cause or causes of actual or apparent faults and provision of resulting information and data for use in display formats assembled by the REACT 2000 operations support system 52. As indicated by the DDS Acceptance Database addressed above, the REACT 2000 provides the ability to select and control physical testing on a communications network. Analysis unit 58, functioning with protocol test unit 46 and the other portions of test means 40, adds the ability to select and control logical testing, making possible the additional capabilities already discussed.

Operation of the complete FIG. 1 test system in a basic protocol/integrated test mode can be described as follows, based on instructions for use of the test system implemented in accordance with the invention.

In a protocol/integrated test mode the FIG. 1 test system can analyze data transmissions while the circuit remains in service and ensures complete privacy of the customer data carried on the circuit. When used in a multipoint environment, the test system shows logical information on overall circuit operation as well as the operation Over each MJU subtending leg or circuit termination. In this way, the tester can view errors and quickly define their point of origin. The system also displays the number of messages transmitted by each leg, allowing testers to identify usage trends and locations in need of higher speed circuits.

In the protocol/integrated test mode the system provides the following test display screens. In this description of an implementation of the invention utilizing the REACT 2000 System in unit 52, the protocol/integrated test mode is referred to as Protocol Vital Signs testing or "PVS".

TREND—the TREND display shows the protocol type and the benchmark, last, and current measurement information for the following parameters:
  Idle circuit percentage
  Message errors
  Active legs
  Systems
  Active stations
  Average message size
  Control Message Factor
  Sample duration
  Message count SYSTEM—The SYSTEM display lists the following information:
  Link Analysis:
    Link setup requests
    Link rejects
    Frame rejects
    Message size—maximum
    Link window size
  Session Analysis:
    LPDA frame count
    FID type
    Active session count
    Bind requests
  Packet Analysis:
    Call requests
    Active calls
    Restart all calls
    Packet rejects LEGS—(SNA only) The LEG ANALYSIS display lists the following information for each leg:
  Messages from A
  Messages to A
  Number of bad messages in each direction
  Number of rejects in each direction STATIONS—The STATION ANALYSIS display list the following information:
  Leg being examined
  Number of stations on the leg
  Station ID number of each station
  Messages from A per station
  Messages to A per station
  Number of bad messages per station
  Number of rejects per station SUGGESTION—The SUGGESTION selection can be made from any PVS display. With this selection, PVS analyzes the contents of the current display and provides suggestions indicating the likely cause of any problems.

STOP—Stops the currently running test.

HOLD—While a test is running, PVS automatically updates the results approximately every six seconds. This selection stops the scrolling if you wish to examine a results display longer.

Testing with PVS

The following procedure describes how to isolate a protocol problem using the PVS feature. To use the PVS feature, perform the following steps:

1) Log onto the REACT 2000 system.
2) On the REACT 2000 Main Menu, select TESTING. The following prompts appear:
Format: TELEPHONE, SERIAL, MESSAGE, FACILITY, ABSOLUTE, NO CKT (T/S/M/F/A/N): Circuit number:
3) Enter the circuit type and circuit number for the circuit you wish to test, pressing RETURN after each. The DDS Access Points display appears.
4) At the bottom of the display is the prompt:
Enter number of access desired: Enter the number of the needed access point and press RETURN. (The numbers to use are the ones listed under the ## column on the display.)
Note: The location accessed for PVS testing must be listed on the Test Resource Status display with DDS/PVS in the ABILITY column.
The Operation menu appears for a moment, while REACT makes the requested access. Then the Protocol Vital Sign menu appears.
5) Select PVS MEASUREMENTS. The following messages appear at the bottom of the menu:
Starting PVS test . . . please wait.
6) The following prompt appears:
Protocol type—Autoconfig. SNA, SNA-NRZI, or X.25 (A/S/N/X)?: A
If you know the circuit's line protocol, enter it at the prompt. If you do not know the protocol, press RETURN to accept the default value A for Autoconfigure. If you use A, the PVS analyzer determines the protocol.
Note: If you use the Autoconfigure selection, determining the protocol may take up to two minutes.
The following message appears: Configuring PVS and starting test measurements When the PVS feature has retrieved all needed information from the database to begin testing, the Protocol Vital Signs—Trend display appears. FIG. 3 shows the format of this PVS trend display.

Examine your Trend display for warning of trouble. Do this by comparing the result of previous tests with the current results. Any large change can indicate a trouble condition. For example, if the Idle Circuit Percentage for the last test was 98 percent and it has suddenly dropped to a value significantly lower, the circuit may be developing problems.

If you are unsure how to interpret the measurements, press the number 7 for SUGGESTION. PVS examines the measurements and offers suggestions.

The Trend display automatically updates approximately every six seconds. If you want more time to examine a display, press the number 9 for HOLD. Once you have selected HOLD, the number of selection changes to NEXT and the display does not update until you select another function. You may view a single update by pressing 9 for NEXT.

7) You can also check the link and session performance. To do so, press the number 2. The PVS—System Analysis display appears. FIG. 4 shows the format of this System Analysis display.

Examine your System Analysis display for signs of trouble. For example, a large number of rejects is normally an indication of a problem. If you are unsure how to interpret the measurements, press the number 7 for SUGGESTION. PVS examines the measurements and offers suggestions.

8) if the previous displays indicate a logical problem exists on the circuit, you can isolate the cause of the problem by examining the circuit's legs and stations. To do so, select number 3 for LEGS. The PVS—Leg Analysis display appears. FIG. 5 shows the format of this Leg Analysis display.

Examine your Leg Analysis display to determine which leg is experiencing the trouble. A distressed leg is normally one that is experiencing a large number of bad transmissions or rejects.

9) The next step is to determine which station on the distressed leg is causing the problem. To do so, use the number 5 (DOWN) or number 6 (UP) keys to highlight the distressed leg. When the needed leg is highlighted, select number 4 for STATIONS. The PVS—Station Analysis display appears. FIG. 6 shows the format for this Station Analysis display.

10) The Station Analysis display shows which leg you are looking at, and lists each station on the leg by its identifier. Examine your Station Analysis to determine which station is experiencing problems. In FIG. 6, we can see by the number of rejects that Station 33 is the problem station.

10) To stop a PVS test, press number 8 for STOP. The updates cease and PVS displays the final results. Once the test has stopped, you can view any screen for the final results it contains. Press number 8 a second time to return to the main PVS menu (Circuit Status display).

BENCHMARKING

PVS benchmarking makes use of the REACT 2000 User-Defined Macro and SMARTEST features to define a circuit's normal operating parameters over a particular period of interest. This is accomplished by performing short tests at regular intervals over a period of hours and days. The results are then averaged to obtain a representative picture of the protocol activity. When specifying a PVS benchmark job, you must choose a benchmark model. A PVS benchmark model describes the period over which the tests are run and the frequency with which they are performed. Three models are provided with PVS benchmarking: LOCAL, GLOBAL, and CONUS.

LOCAL—The LOCAL model allows benchmark testing to run Monday through Friday. For example, if you initiate a benchmark job on a Wednesday before 8:)) a.m., testing runs on Wednesday, Thursday, Friday, Monday, and Tuesday. Testing begins at 8:00 a.m. and continues until 6:00 p.m. each day. Each circuit is tested for one minute out of every hour. The benchmarking job continues for five days before results are tabulated by the test equipment and reported to the REACT 2000 system controller.

GLOBAL—The GLOBAL model allows benchmark testing to run every day. Testing begins at midnight on the day the benchmark job is submitted. Each circuit is tested for one minute our of every hour. The benchmarking job continues for seven days before results are tabulated by the test equipment and reported to the REACT 2000 system controller.

CONUS—This model is the equivalent of the LOCAL model, with the daily period extended. Testing begins at 7:00 a.m. and continues until 9:00 p.m. The following table summarizes these models. If the three provided models are not adequate for your purposes, new models may be created by calling Hekimian customer support.

| | PVS BENCHMARK TESTING MODELS | | | | |
|---|---|---|---|---|---|
| | | DAILY PERIOD | | | |
| | VALID TEST | | | TEST | NUMBER OF |
| MODEL | DAYS | FIRST | LAST | LENGTH | DAYS |
| LOCAL | M, Tu, W, Th, F | 8:00 | 18:00 | 1 min | 5 |
| GLOBAL | Su, M, Tu, W, Th, F, Sa | 0:00 | 23:00 | 1 min | 7 |
| CONUS | M, Tu, W, Th, F | 7:00 | 21:00 | 1 min | 5 |

PVS benchmarking makes use of the REACT 2000 SMARTEST capabilities. Actually, you create a SMARTEST job that contains the PVS benchmark test. If you are not already familiar with SMARTEST and how to create and submit SMARTEST jobs, refer to the SMARTEST section of the REACT 2000 manual before attempting to submit a PVS benchmarking job.

PVS benchmarking makes use of the REACT 2000 User-Defined Macros feature. The macro "PVSBENCH" is provided with REACT 2000 as part of PVS benchmarking. This macro or test routine has two parameters: the access number and the benchmark model. The access number refers to the access point selection. If omitted, the default is used. The model is the PVS benchmark model for this circuit. Different circuits may use different models within the same SMARTEST.

When the SMARTEST starts, the macro determines the first day where a complete test period can be performed and waits until the day to begin testing. For example, if a PVS benchmark SMARTEST IS STARTED ON A Wednesday at 11:00 a.m. and a circuit within the test is using the LOCAL model, the first sample for the benchmark would be taken on Thursday at 8:00 and the test days would be Thursday, Friday, Monday, Tuesday, and Wednesday.

Since PVS benchmark intervals are scheduled events, some limitations are placed on the number of circuits which can be benchmarked simultaneously. A single PVS test set can handle up to 15 circuits when using any of the three models. If you request a new model, this number may drop.

While the PVS benchmarking SMARTEST is running, there may be periods of time when the PVS test resource is not being used. If this time is longer than 15 minutes, the SMARTEST will relinquish control of the resource. Therefore, any potential user of that resource should be aware of the benchmarking operation and keep any PVS sessions short.

To create and submit a PVS benchmark job, perform the following steps:

1) On the REACT 2000 Main Menu, select SMARTEST. The SMARTEST Routines menu appears.

2) Select EDIT OR COPY A SMARTEST JOB REQUEST. The following prompt appears:
Edit or Copy a job request?)E/C): E 3) Press RETURN to accept the default entry E for EDIT. The SMARTEST editing display appears with the cursor in the JOB NAME field.

4) Enter the name to identify this benchmarking job and press RETURN.
The message EDITING NEW JOB appears in the lower right corner of the display just above the function key descriptions.

5) Press the F5 function key to insert a circuit in the SMARTEST job.
The Smart Edit Insert Entry display appears, including the following prompt:
CIRCUIT FORMAT: TELEPHONE, SERIAL, MESSAGE, FACILITY, ABSOLUTE (T/S/M/F/A):

6) Enter the letter designation for the required circuit type and press RETURN. The following prompt appears:
Circuit number: / / / / /
Note: The exact spacing of the field separators depends on the circuit type selected. For the Absolute circuit type there are no separators.

7) Enter the circuit number of the first circuit you wish to include in this SMARTEST job and press RETURN. The DDS Access Points display appears, listing all access points for the circuit you entered. The display includes the following prompt:
Macro line?

8) Enter the command string PLAY PVS-BENCH and press RETURN. PLAY is the command that tells REACT 2000 to retrieve a macro.
PVSBENCH is the provided macro for PVS benchmark testing. The following prompt appears:
PARAMETERS:

9) As the display indicates, the two needed parameters are the access number and the bench mark model you wish to use. Enter these parameters on one line, separated by a space. For example:
PARAMETERS? 2 LOCAL
The access numbers you may enter appear in the ## column of the DDS Access Points display. The benchmarking models are described at the beginning of this section.
The following prompt appears:
Do you want to add another circuit to this job request ?

10) If you do not want to add more circuits to this job, press RETURN to accept the default entry N. If you wish to add more circuits, enter Y and press RETURN.

11) If you have decided to add more circuits to the job, repeat Steps 5 through 10 until all circuits have been added.

12) When you have answered N to the "add another circuit" prompt, the SMARTEST editor display reappears. The display now shows all circuits you have included in the SMARTEST job, the macro to be called for each circuit, and the parameters for each macro. To exit the editor, press the F8 function key.

13) To save the SMARTEST job, answer Y to the following prompts:
EXIT, ARE YOU SURE (Y/N): SAVE EDIT, ARE YOU SURE (Y/N);
The SMARTEST Routines menu reappears.

14) To start the PVS benchmarking SMARTEST, select START? RESTART A SMARTEST JOB. The following prompt appears:
Enter Jobname (15 characters max)

15) Enter the name you gave the job and press RETURN. The following prompt appears:
Job request already exists, do you want to resubmit this job? (Y/N): N 16) Enter Y and press RETURN. The following prompt appears:
Reschedule? No or in how many days? (N/1-365): N 17) Press RETURN to accept the defaults entry N. The following printer prompts appear:
Which printer for log? Enter LPxx or NOPRINT:
Which printer for results (if any)? Enter LPxx or NOPRINT:

18) Enter the desired responses to the printer prompts, pressing RETURN after each. The following prompt appears:
Enter time in the following form: 15-Jan.-1901:09:40:15
Enter start time: 15-Jan.-1991:09:40:15

19) Accept the current date and time or enter the desired start time. Press RETURN. The following prompt appears:
Enter permitted execution hours (0-999, 0 for no limit): 0

20) Press RETURN to accept the default entry 0. The PVS benchmarking model you selected will control the execution hours. The following prompt appears:
Press RETURN to continue 21) Press RETURN. The SMARTEST Routines menu reappears. Your PVS benchmarking SMARTEST has been entered and submitted. You may now press consecutive zeros to return to the REACT 2000 Main Menu.

In the foregoing description of the protocol/integrated mode of the FIG. 1 test system based upon operating instructions, it should be understood that the individual operator will be operating the test system through use of a terminal such as 62A at a local site or 62B at a remote customer site. Thus, assuming a customer has arranged to have access to a central test unit, such as unit 40, located at the carrier's offices, the customer's service personnel can respond to a problem in data transmission by taking direct action toward identification of existing faults.

The TREND display screen as described above may include an operational figure of merit identified as the "Control Message Factor". In accordance with the invention, the Control Message Factor is stated as a value from 0 to 10 (with higher values indicative of degraded performance) representing a composite of three performance measures. The Control Message Factor is determined basically as follows. A first sub-factor of from 0 to 5 is assigned to the ratio of supervisory control messages to total messages on a particular circuit over the range of 0 to 100%. A second sub-factor of from 0 to 5 is assigned to the ratio of bad messages to total messages on the circuit over the range of 0 to 1%. A third sub-factor of from 0 to 5 is assigned to the ratio of message flow control count to total messages over the range of 0 to 1%. The message flow control count is representative of controls on the flow of messages as between messages transmitted, messages received and messages still in transit which may limit the ability to add more messages to the in-transit flow of messages.

The Control Message Factor represents the sum of the first, second and third sub-factors, with any aggregate of the sub-factors which equals or exceeds 10, shown as a 10. Thus, if in a particular instance each sub-factor was equal to 1, the Control Message Factor would be shown as a 3, which is an acceptable level on the 0 to 10 scale. If the sub-factors were 3,3 and 5, the resulting Control Message Factor of 10 would indicate unacceptable operation. With this explanation, it will be understood that the Control Message Factor is a composite figure of merit providing the operator with an evaluation factor otherwise requiring the operator to consider the combined relevance of the three component performance measures. It will be appreciated that other variations of factor valuations and combinations of sub-factors may be used in arriving at the Control Message Factor.

Also in the foregoing description, instructions are given to "press the number 7 for SUGGESTION." FIG. 7 is an example of the form of suggestion format which is provided. In FIG. 7, relating to Leg Analysis, a description of the specific circuit under test, plus observations derived from the Leg Analysis data, are first provided. That information is followed by suggestions derived utilizing diagnosis based on expert knowledge and experience as relevant to past problems of a similar nature. As shown, suggestions direct the tester to take specific action in a suggested order, with further guidance as to how to interpret the result of such action.

In accordance with the invention, and based on the foregoing description, one example of a method for performing locally and/or remotely accessible testing of a digital telecommunications system having a plurality of digital transmission circuits, comprises the steps of:

(a) providing access to one or more selected circuits of the telecommunications system, such as circuit 12 in FIG. 1;

(b) performing selectable tests of respective digital protocols associated with digital data carried by such one or more selected circuits, by operation of protocol test unit 46, and/or transmission tests on the one or more selected circuits, by operation of physical test unit 44;

(c) storing, in data storage unit 56, statistical data based on results of step (b) and/or previous tests relating to the one or more selected circuits;

(d) accessing, via analysis unit 58 and/or operations support system 52, stored decision trees and/or rules and stored fault analysis procedures useful for identifying and analyzing faults affecting data circuits, including rule and procedure steps for selecting additional testing and/or analysis;

(e) analyzing, by operation of analysis unit 58, the results of step (b) selectively using test data stored in step (c) by traversing in a predetermined manner selected items of such decision trees and/or rules and fault analysis procedures to derive information indicative of possible faults affecting the one or more selected circuits including diagnosis of probable cause or causes of actual or apparent faults related to data transmission on the one or more circuits;

(f) determining, by operation of analysis unit 58 based on analysis and diagnosis carried out in step (e), whether additional protocol and/or transmission tests are appropriate and causing repetition of step (b) to perform any such additional tests determined to be appropriate, in order to provide additional test results;

(g) repeating step (e) as necessary to utilize the additional test results, if any, recognizing that the determination in step (f) may be that no additional tests are identified as helpful for further diagnosis of faults;

(h) providing the information derived in step (e), including any repetition thereof, for use at a local and/or remote location via interconnect modem 54, for example;

(i) displaying at the local and/or remote location on display 64B, for example, said information indicative of faults and diagnoses of probable cause of such faults; and (j) permitting selection at the local and/or remote location for use of terminal 62B, for example, of specific circuits to be addressed by steps (a) through (i).

It will be understood that application of the invention need not utilize all of the preceding steps (a) through (j). For example, steps (f) and (g) may be omitted.

FIG. 8 TEST SYSTEM

Referring now to FIG. 8, there is shown an alternative embodiment of a test system in accordance with the invention. In FIG. 8, a plurality of circuit access units 38A, 38B and 38C, similar to unit 38 in FIG. 1, are shown coupled at different points in a telecommunications network to a large number of individual transmission circuits, some of which may be accessible by more than one access unit. As shown, the individual circuit access units 38A, 38B and 38C are coupled to concentrator means, shown as concentrator switch 70, which effectively enables access from central test unit 40 to any circuit accessible by any of the connected access units 38A, 38B and 38C, via concentrator 70. Concentrator switch 70 may desirably be a digital cross-connect system such as a Hekimian Super DCS Concentrator or a Tellabs, Inc. model 5323 T-Carrier Cross-Connect System. By way of example, one of the largest long-distance carriers in the United States utilizes approximately fourteen concentrator systems (corresponding to concentrator 70) each connected to as many as nine circuit access units (corresponding to units 38A, 38B and 38C). All of these fourteen concentrator systems are coupled to a central REACT 2000 Operations Support System to permit individual monitoring and test of thousands of circuits on a coast-to-coast basis from the carrier's network operations center.

In FIG. 8, concentrator 70 is shown coupled to central test unit 40, corresponding to unit 40 in FIG. 1. Shown coupled to unit 40 are second test means 60A–D, corresponding to test units 60A and B in FIG. 1. As illustrated, test unit 60A may be co-located with central unit 40 and directly connected, while remote test units 60B–D may be selectively coupled on an as-needed basis from other carrier locations or customer facilities around the country or the world.

Operationally, the FIG. 8 test system functions in the same manner as the FIG. 1 system, except that the concentrator switch 70 enables a single central test unit 40 to service any one or more of an extremely large number of geographically diverse circuits to carry out transmission and/or logical testing under the control of one individual tester. More particularly, these tests and related fault analysis can be made directly accessible to an individual tester in a customer facility in California, even though the central test unit could be located in Philadelphia, for example. It will also be appreciated that, other than the necessity for obtaining approval to use the carriers test system, the customer need only provide a standard type of personal computer and pay for telephone line usage on a dial-up, as-needed basis. From the carrier's viewpoint, increased customer test capabilities can remove the carrier's technical representatives from physical versus protocol fault resolution discussions and provide the opportunity to make the carrier's test system available to customers on a time-shared basis on an annual subscription or other compensated arrangement.

FAULT DIAGNOSIS AND SUGGESTIONS

As already described, FIG. 7 shows an example of a visual screen presentation of remedial observations and suggestions provided by the FIG. 1 test system, which are derived through fault diagnosis based on analysis of logical and/or transmission tests of a circuit.

As shown in FIG. 7, for example, the contents of a suggestion screen can include a description of the logical circuit under test. In this instance, the test system has provided the circuit description: "Multipoint circuit with access to the MASTER LEG—6 active legs with 47 active users." This provides the test system operator with a summary of the format of a complex circuit arrangement which may involve users at widely separated locations. Under the heading "OBSERVATIONS", the FIG. 7 screen gives the observed "User Error Free Message" rate and states that the "Probability of network fault is 75%." This latter statement of probability relates to the presence of a physical fault. The following observation as to a similar error rate on four different legs represents results of protocol testing. The "SUGGESTIONS" listed in the FIG. 7 screen will be seen to include a suggestion number (2) to run PVS protocol tests to check error rates on each circuit leg, as well as suggestions (1) and (3) regarding checking MJU (multiple junction unit) configuration and operation.

The analysis and diagnosis information provided on the suggestion screens, which in the case of FIG. 7 relates to circuit leg analysis, represents the results of evaluation of test data against expert knowledge and experience as to the types of faults which can be expected to produce particular circuit conditions. In accordance with the invention, analysis unit 58 functioning with operations support system 52, within the central test unit 40 of the FIG. 1 test system, derives suggestion screens based upon expert fault analysis and diagnosis such as the following examples.

Trend Screen Suggestions (1) If the number of active sites determined to be coupled to a circuit under test (based on information relative to both directions along the circuit, i.e., A to Z and Z to A) is zero, then the suggestion reads:
"Insufficient information for suggestion."
If the numbers of active sites A to Z and Z to A are each exactly one, then the suggestion reads:
"This is a point to point link."
If the number of active sites A to Z is greater than one and Z to A is exactly one, the suggestion reads:
"Multi-drop link accessed on a leg."
If the numbers of active sites A to Z and Z to A are each greater than one, the suggestion reads:
"Multi-drop link accessed on Master Segment." Otherwise, the suggestion reads: "Unrecognizable link configuration."

(2) If the protocol in use is X.25, SNA or SNA/NRZI, the suggestion reads:
"Try stress test pattern number 2 first."
If the protocol in use is BSC, the suggestion reads:
"Try stress test pattern 3 first."
Note: As shown in FIG. 9, stress tests 2 and 3 are standardized data transmissions designed to simulate particular types of protocols.

System Screen Suggestions (1) The suggestion text will always read:
"User Error Free Msg. rate A to Z is NN.X"
"Z to A is NN.X."
"Probability of Network Fault A to Z is XX%."
"Probability of Network Fault Z to A is XX%."
Note:
  (a) "User Error Free Msg." or "UEFM" is defined as 100, less the greater of either error messages or rejects divided by total messages, stated as a percentage.
  (b) Network Fault probabilities are:

| UEFM | Fault Percentage |
|---|---|
| 0.0 to 0.0001 | 0% |
| 0.0001 to 0.001 | 10% |
| 0.001 to 0.07 | 25% |
| 0.07 to 0.1 | 50% |
| 0.1 and higher | 95% |

(2) If LPDA Netview frames are present on an SNA protocol, the suggestion reads:
"Circuit under Netview control."
"Request IBM Netview administrator to deactivate LPDA on this circuit to permit PVS analysis."
"Ignore bad message count when LPDA is active."

(3) If the total number of link setup requests is greater than twice the number of active sites on a circuit, the suggestion reads:
"High probability of non-responding controller."
"Legs with all traffic in one direction are candidates for further testing."
"Perform Loopback tests on these legs."
If the total number of frame rejects (FRMRs) is greater than five, the suggestion reads:
"Protocol difficulties observed on link."
"Contact network administrator."
Otherwise, the suggestion will read:
"No protocol difficulties observed on link."

(4) If the total number of rejects on a circuit is greater than 0.1% of total traffic and the window size is greater than two, the suggestion reads:
"Frequent retransmissions on line, expect response time delays."

Site Screen Suggestions (1) If the total message count (both directions) is less than 100, the suggestion reads:
"Insufficient Information Currently."
If the total number of bad messages (CRC errors) is less than 0.1% of the total message count (less than 1 in 1000) and the total number of rejected messages is also less than 0.1%, then the suggestion reads:

"No significant protocol or transmission problems noted."

If either the reject count or the bad message count is greater than 1 in 1000 messages, then a suggestion is generated that indicates which direction the trouble is in as follows:

If the majority of bad messages is A-Z and the reject count Z-A is within 2 of the bad message count, then the suggestion reads:

"The problem is in direction A-Z."

If the majority of bad messages is A-Z and the reject count Z-A is NOT within 2 of the bad message count, then the suggestion reads:

"The problem is in direction Z-A."

If the majority of bad messages is Z-A and the reject count A-Z is within 2 of the bad message count, then the suggestion reads:

"The problem is in direction Z-A"

If the majority of bad messages is Z-A and the reject count A-Z is NOT within 2 of the bad message count, then the suggestion reads:

"The problem is in direction A."

(2) If there are greater than four total sites, and there are errors present on some legs, the suggestion reads:

"Suspected MJU fault or cascaded MJU segment is common to all legs shown with errors."

"Retest with PVS access at each MJU leg."

Station Screen Suggestions (1) If the total message count is zero, the suggestion reads: "Insufficient information for suggestion."

If information frames are less than 33% of total frames, the suggestion reads:

"Heavy control overhead observed for site."

If information frames are greater than or equal to 33% of total frames, the suggestion reads:

"Minor control overhead—data throughput very good."

(2) If errors (bad crc or frame rejects) are all associated with a single station, the suggestion reads:

"All errors are associated with a single station."

"Suspect station configured incorrectly. Not a link transmission problem."

Although the basis for determining the preceding circuit diagnosis suggestions will be seen with hindsight to involve relatively straight-forward application of the results of circuit tests with expert interpretation, the benefits of the insights thereby provided to the tester are extremely helpful. To the experienced technical person the suggestions focus in on most relevant fact patterns and assist and confirm conclusions reached as to fault analysis. To the individual relatively unskilled in circuit testing and diagnosis, or to the individual skilled in physical testing but not protocol testing, the benefits can be dramatic. The individual may be enabled to determine effective corrective action which would otherwise be clearly beyond the individual's capabilities based on current level of knowledge and experience.

A tester using the FIG. 1 test system in the PVS mode may request a SUGGESTION display which interprets nonintrusive protocol test results. Protocol training is not required to permit implementing such suggestion requests.

The most valuable suggestion for the interpretation of protocol test results may be the information as to the actual type of logical circuit involved, whether point-to-point or multi-point (see "LOGICAL CIRCUIT DESCRIPTION" example in FIG. 7). Further definition includes whether the access is at the master segment or a leg of a multi-point circuit. This information is essential in being able to properly associate the trouble reported with the diagnostic procedure.

Figure 10:
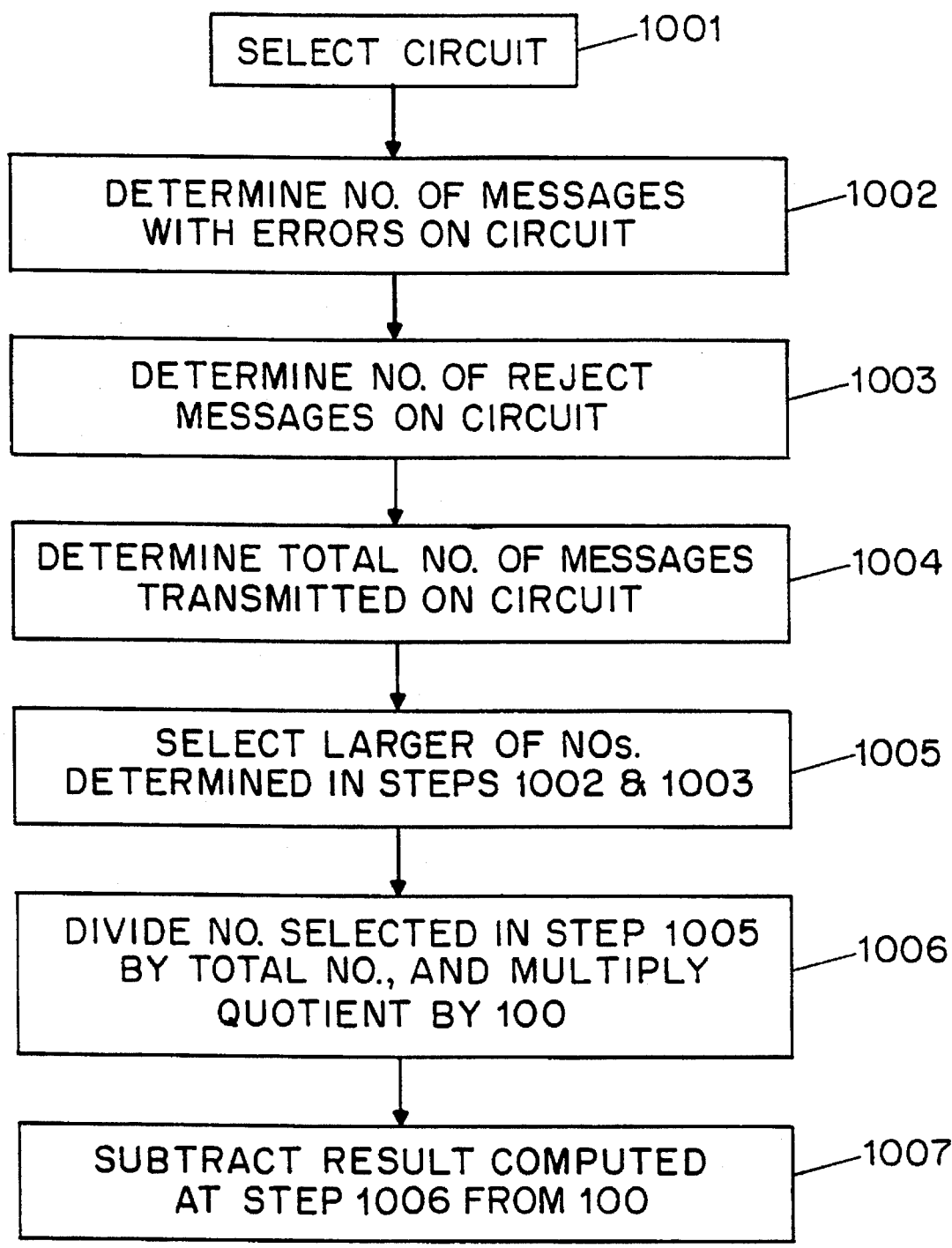
FIG. 10 is a flow chart illustrating steps of deriving a User Error Free Message percentage in accordance with the invention.

The User Error Free Message percentage is displayed and correlated to indicate the probability of a physical network fault. Confirmation of the severity of the problem in terms of actual user data derived through testing is a great aid in assignment of scarce personnel and equipment resources to the more significant situations. More particularly, a method for deriving a User Error Free Message (UEFM) percentage as a figure of merit value relating to performance of a digital data transmission circuit is illustrated in FIG. 10. The method following steps respectively denoted 1001–1007 in FIG. 10:

(a) selecting a circuit for evaluation;

(b) determining the number of messages with errors on the circuit in a period of time;

(c) determining the number of reject messages on the circuit in such period of time;

(d) determining the total number of messages transmitted on the circuit in such period of time;

(e) selecting the largest of the numbers respectively determined in steps (b) and (c);

(f) dividing the number selected in step (e) by the total number determined in step (d) and multiplying the result of that division by one hundred; and (g) determining a User Error Free Message percentage by subtracting the number determined in step (f) from 100.

It is noted that steps (f) and (g) above may alternatively be stated as determining a User Error Free Message percentage as the correlative percentage to the percentage represented by dividing the number selected in step (e) by the total number determined in step (d). Thus, if step (e) divided by step (d) equals 0.25, representing 25% the UEFM is the correlative percentage (100%–25%) or 75%. The "correlative percentage" is defined as the difference between 100% and a referenced percentage.

Another aspect of the suggestion presentation identifies which of the four standardized stress patterns should be used to most accurately duplicate the user's data transmissions in order to provide the most representative stress test results.

In-depth analysis of the traffic levels and errors experienced on a multi-point circuit provides a suggestion that a cascaded MJU segment should be analyzed further. This capability of pinpointing a suspected circuit element substantially increases the diagnostic capabilities of a transmission-oriented test person to address problems before requiring assistance from a protocol specialist.

IBM Netview control of SNA circuits is detected and disclosed on the System screen. An important suggestion advises the test operator to contact the circuit user's netview administrator to request deactivation of LPDA on the circuit under test in order to permit valid PVS measurements. Such cooperation between the test system operator and the Netview administrator can substantially reduce the time required to identify the causes of faults and restore service.

This discussion of the nature and usefulness of suggestions provided in accordance with the invention serves to introduce the benefits and attributes of integrated transmission and protocol testing and diagnosis. The next level of fault analysis and diagnosis in accordance with the invention involves the use of the suggestion information, by the test system itself, to automatically initiate additional diagnostic tests. This capability of the invention, termed "Interactive Automation", introduces a new concept and level of capability in circuit test and fault diagnosis.

PVS INTERACTIVE AUTOMATION

Some of the suggestions provided to the test individual by the test system, as described above, recommend specific additional action that is within the capabilities of the test system to carry out, if instructed to do so. In the discussion above it is implicitly assumed that when the suggestion screen of the test system makes a suggestion such as "Run PVS test on each leg of the MJU", as shown in FIG. 7, that the operator is then left to actually initiate such testing. However, with the test system having determined the desirability of further tests on each leg of the MJU in the circuit under test, in accordance with the invention the test system is enabled to take additional diagnostic steps by (a) automatically implementing such additional test on the MJU legs and (b) analyzing the results of the additional tests in a manner reiterative of the initial analysis of the original test results which led to the suggestion of the additional tests. Thus, the system effectively responds to the suggestions it has derived and automatically proceeds to implement additional tests and reiterate analysis and diagnosis steps using the additional test results.

Operationally, PVS Interactive Automation is implemented by interaction of analysis unit 58 with operations support system 52 within the context of the complete test system. As a result, the operations support system (i.e., a REACT 2000 system) automatically initiates additional transmission and/or protocol tests on the circuit under test or additional related circuits, or both.

For example, where the circuit under test is a component member of a higher bandwidth, higher capacity circuit (e.g., one of 24 DSO 64 kilobit channels in one T-1 1.544 megabit channel), and there is a suggestion of a T-1 circuit fault rather than merely a DSO component channel fault, additional DSO channels within the same T-1 circuit can be tested individually. Such additional tests can be helpful because errors randomly affecting the T-1 circuit will cause a similar error density on each DSO component channel. Therefore, the test system, seeking to diagnosis the fault causing errors on the DSO channel under test, will non-intrusively monitor the error rate on three representative DSO channels within the same T-1 circuit in order to determine error rate comparability. If the fault concerns the T-1 circuit itself the percentage of errors on each DSO channel can be expected to be essentially the same, whereas if the fault affects a single DSO channel a wide disparity in the percentage of errors on each DSO channel can be expected. In this way, the relative percentage of errors on each DSO channel under test can be used in analysis of whether the problem exists at the DSO or T-1 level.

The test system, in the Interactive Automation mode, extracts from the circuit data base identification of the parent T-1 circuit of the DSO channel under test and then implements tests of other sibling circuits (i.e., other component DSO circuits) until two additional DSO channels are found which have sufficient data traffic to permit representative error density measurements. The three sibling DSO channels are then compared as to relative error density.

In most data networks 80% to 90% of the T-1 circuits are not currently equipped to provide non-intrusive measurement of transmission errors, as contrasted to intrusive tests necessitating interruption of service. The ESF (extended super frame) configuration provides such non-intrusive measurement capability, but is not presently employed sufficiently widely to provide quality measurements. The majority of existing circuits use D4 framing which provides no error detection capabilities for data content.

Accurately determining whether the parent T-1 circuit is the source of the errors experienced on the DSO channel under test, or whether the specific DSO circuit under test is actually the source, is essential to being able to effectively direct efforts to testing the right component of the communication network. For some carrier networks, different groups of technical personnel are actually responsible for testing at the T-1 level and at the DSO circuit level. It thus becomes important to avoid wasted efforts by the wrong group.

This same approach can be used by the test system in testing subrate channels of the DSO circuit. The DSO circuit may contain a multiplicity of subrate channels (i.e., 2.4, 4.8 and 9.6 kilobit channels). The test system can determine whether the parent DSO circuit is the source of errors or whether the source is a subrate channel. As with the DSO and parent T-1 relationship, if there are several 2.4 kilobit subrate channels with comparable error percentages, then the parent DSO channel becomes suspect and it may be successively necessary to test the parent T-1 circuit of the DSO circuit, so that it becomes a cascaded analysis process.

This discussion focusing on a particular example of the PVS Interactive Automation mode establishes the significance and application of first order test system derived diagnostic suggestions as the basis for automated request and analysis of additional tests on the circuit under test and/or additional related circuits. This expert system implementation, whereby knowledge and experience of technical experts in the areas of transmission and protocol testing and fault analysis is implemented by sets of rules applied to derive diagnostic suggestions which are in turn automatically used as the basis for implementing additional testing, analysis and diagnosis, provides a powerful tool. Technical personnel qualified in transmission and protocol testing of complex networks are supported by confirmatory and extended diagnostic suggestions. Less qualified technical personnel are quickly enabled to carry out practical fault diagnosis. It will be appreciated that both the basic PVS analysis in the protocol/integrated mode and the second order Interactive Automation mode can be made available to the test system user via remote terminal from the customers facility.

BENCHMARK PROFILES

As previously described, the Benchmark feature enables data representative of acceptable operation of a circuit to be acquired and stored for use on a reference basis in the analysis of transmission and protocol faults, which may arise in later time periods. Reference is made to apparent faults because in some cases a future degradation in circuit performance may, upon benchmark comparison, be shown to be due to increased circuit message volume or differences in type of usage, rather than any fault.

One approach to providing reference data would be to store actual digital data sampled from message traffic on a circuit and retain the sampled data for later use. An immediate problem with this approach is that even limited samples of high-speed message transmissions represent a significant amount of data requiring storage and a complete set of prior measurements for any significant time duration, where thousands of circuits may be involved at a carrier's office, would require an excessive volume of data storage. Also, when such stored samples were to be used in later fault analysis, the analysis process would be slowed by the volume of stored data involved.

In view of this, benchmark profiles in accordance with the present invention are derived by condensing the information in the digital data samples into profile data representative of one or more characteristics of the sampled message traffic. For purposes of this invention, a "benchmark profile" is defined as a set of statistical measures or data, representative of one or more characteristics of message traffic on a selected circuit, which is derived from digital data sampled during acceptable operation of that circuit. The characteristics represented in a benchmark profile may typically include one or more of the following: idle circuit percentage, message errors, active legs, active stations, average message size, control message factor, sample duration and message count. The data representative of such characteristics is derived by analyzing digital data samples to develop statistical models (i.e., mathematical representations, etc.) indicative of the characteristics.

For example, known forms of statistical analysis may be applied to derive mean, median and standard deviation values indicative of average message size in the digital data samples relating to a particular circuit. By storing these statistical values, and discarding the actual digital data samples which represent a significant volume of data, a benchmark profile can be efficiently stored for later use while limiting the volume of data requiring storage.

In accordance with the invention, a typical application of the process for developing a benchmark profile and system operation using such benchmark profile are described in the following sections.

Benchmark Process Steps

1) Define a sampling model that is typical to the normal circuit operation. Examples are: LOCAL—sample once per hour, eight hours per day, Monday through Friday; CONUS—sample once per hour, thirteen hours per day for five days; GLOBAL—sample once per hour, twenty-four hours per day, for seven days. Examples of system operating instructions for implementing such sampling are included above, under the heading "BENCHMARKING".

2) The operator of the test system selects one or more specific circuits for which benchmark profiles are to be developed.

3) The test system is activated to record samples of digital data for each selected circuit according to the sampling model selected.

4) On completion of the sampling, the samples of digital data recorded for each selected circuit are reviewed to determine whether the samples are reasonably representative of message traffic during acceptable operation of the circuit. If a sufficient number of samples for a specific circuit contain actual data and if the amount of data indicates the circuit is typically operational, the sampling for that circuit is considered reasonably representative. Otherwise, the operator is given an indication that during the sampling period the circuit did not contain a sufficient quantity of valid data. In such case the test system is activated to repeat the recording of samples of digital data for one or more circuits for which the first sampling process did not provide reasonably representative data.

5) The test system then analyzes the recorded samples of digital data for each selected circuit to derive a benchmark profile for each circuit including data representative of one or more of the following message traffic characteristics: idle circuit percentage, message errors, active legs, active stations, average message size, control message factor, sample duration and message count. It will be noted that these are the characteristics for which benchmark profile comparison with more current data is provided in the typical PVS Trend screen example shown in FIG. 3.

One example of the analysis of digital data samples to derive data values representative of a message traffic characteristic is the derivation of statistical representations of messages on a selected circuit. Other and more extensive applications of known mathematical analysis models may be used, for example to determine if there are several different data message distribution patterns existing on a particular circuit simultaneously. Such multiple patterns would indicate that several different user applications are operating on the circuit at that time and such information would be valuable for consideration in future fault analysis.

6) When a satisfactory benchmark profile is achieved, the data is stored in the data storage unit and is indexed to the particular access point utilized in carrying out the sampling for each specific circuit for which a benchmark profile has been developed.

7) Consistent with the availability of the benchmark profiles for future fault analysis use, the actual samples of digital data used in deriving the benchmark profiles are no longer needed and can be deleted from storage and discarded. By requiring retention of only the benchmark profiles, and not the volume of actual sampled digital data, data storage requirements are greatly reduced.

Benchmark Operation

1) The test operator runs a test on the system and is visually presented with the results of the current test as well as the benchmark profile in a screen display such as shown in FIG. 3.

2) Secondary parameters utilized in the development of the benchmark profile are not presented to the test operator, but are used in the analysis process in the development of suggestions provided for fault diagnosis as discussed above (see, for example, FIG. 7).

3) The operator is able to compare data based on current measurements with the benchmark profile data. Substantial deviations that might be indicative of a change in the manner in which a circuit is being used, i.e., a change in the application which the circuit is supporting, become apparent to the operator by comparison of the benchmark and current data.

4) The operator may select the suggestion screen presentation. The suggestion development process, as already described, will provide analysis and comparison of current measurement data with the benchmark profile data, including consideration of parameters not presented to the operator, such as standard deviation analysis, for example. Thus, the suggestion process can bring to the operator's attention subtle differences or other relationships that may have been discernible only by an expert with prior experience in the particular operational circumstances then affecting the circuit under test.

5) The suggestion development process, as described above under the heading "Fault Diagnosis and Suggestions" will inclusively and in combination examine, with the application of expert fault analysis insights, the following areas: current protocol data measurements, benchmark profile data, transmission test measurements, transmission measurement standards and test limits. This process of suggestion development can advise the operator of combinations of factors whose relevance would previously have been detected only by an expert able to assimilate results provided through tests carried out with numerous items of separate test equipment.

6) As described above, under the heading "PVS Interactive Automation", the suggestion process may either indicate to the operator or actually automatically implement additional tests to request additional information determined to be desirable in view of a first level of tests. As described, such additional tests may involve other MJU legs or parent or sibling circuit tests.

7) Based on the results of such additional tests, further additional suggestions can be generated for the operator, including not only additional fault diagnosis suggestions, but possible suggestions for further tests.

It should be noted that operational benefits of this test system can be further realized by taking full advantage of the capabilities of the REACT 2000 operations support system to permit the scheduling of tests to be automatically implemented by the system. Thus, quality assurance can be significantly enhanced by establishing a model for more frequent "watchdog" test sampling after a particularly difficult fault has occurred, been solved and the circuit restored to acceptable service. In order to permit undelayed response to a possible recurrence of such fault, the watchdog testing schedule would quickly indicate a recurrence of the prior conditions, so as to alert the test system operator to take corrective action. At the time of taking such action, the test operator could also advise the user of the circuit that corrective action was underway, without waiting for the user to report that the prior problem had not been fixed or had recurred.

While there have been described what are believed to be the preferred embodiments of the invention, those skilled in the art will recognize that other and further modifications may be made thereto without departing from the invention and it is intended to claim all such changes and modifications as fall within the true scope of the invention.

I claim:

1. A method for diagnosing faults in a communications network including a plurality of transmission circuits carrying data messages, comprising:

a first step of accessing a selected one of said plurality of transmission circuits;

a second step of measuring number of messages with errors on the selected circuit in a predetermined period of time;

a third step of measuring number of indicia of rejected messages on said selected circuit in said predetermined period of time;

a fourth step of measuring a total number of messages transmitted on said circuit in said predetermined period of time;

a fifth step of selecting the largest of the numbers measured in the second and third steps;

a sixth step of forming a ratio of the number selected in the fifth step to the total number measured in the fourth step; and a seventh step of deriving a probability of having at least one fault in the selected circuit, said probability being a function of at least said ratio.

2. The method of claim 1 wherein said at least one fault is a physical fault.

3. A method for diagnosing faults in a communications network including a plurality of transmission circuits each carrying data messages in a first direction and a second different direction thereof, comprising:

a first step of accessing a selected one of said plurality of transmission circuits;

a second step of measuring number of messages with errors in the first direction of the selected circuit in a predetermined period of time;

a third step of measuring, in the second direction of the selected circuit, number of indicia of rejected messages in said predetermined period of time; and a fourth step of determining presence of at least one fault in the selected circuit based on the numbers measured in the second and third steps.

4. The method of claim 3 wherein said fourth step includes the step of determining whether said at least one fault is a logical fault.

5. The method of claim 3 wherein said fourth step includes the step of determining whether said at least one fault is a physical fault.

6. The method of claim 3 wherein said fourth step includes the step of locating said at least one fault in the selected circuit.

7. A method for diagnosing physical faults in a communications network including at least one transmission circuit, said at least one transmission circuit comprising a first subcircuit and a second subcircuit terminating at a first termination point at one end and a second termination point at the other end, said first subcircuit carrying data messages in a first direction from said first termination point toward said second termination point, said second subcircuit carrying data messages in a second direction from said second termination point toward said first termination point, said method comprising:

a first step of accessing said at least one transmission circuit at an access point between said first termination point and said second termination point;

a second step of measuring number of messages with errors in the first direction of said at least one transmission circuit in a predetermined period of time;

a third step of measuring, in the second direction of said at least one transmission circuits, number of indicia of rejected messages in said predetermined period of time; and a fourth step of determining presence of at least one physical fault in said at least one transmission circuit based on the numbers measured in the second and third steps, said fourth step including the step of determining whether said physical fault is located on said first subcircuit between said access point and said second termination point.

* * * * *

UNITED STATES PATENT AND TRADEMARK OFFICE
CERTIFICATE OF CORRECTION

PATENT NO. : 5,481,548  Page 1 of 2

DATED : January 2, 1996

INVENTOR(S) : J. Ligthsey Wallace

It is certified that error appears in the above-indentified patent and that said Letters Patent is hereby corrected as shown below:

On title page, column 1 , 5th line from bottom, "4,990,817  2/1991" should read --4,490,817  12/1984--

Col. 11, line 6, "Over" should read --over--

Col. 12, between lines 34 and 35, insert -- .... --

Col. 12, between lines 46 and 47, insert -- ... --

Col. 13, line 47, "10)" should read --11)--

Col. 14, line 4, "8:))" should read --8:00--

Col. 14, line 16, "our of" should read -out of--

Col. 16, line 29, "15-Jan.-" should read --15-jan- --

Col. 16, line 31, "15-Jan.-" should read --15-jan- --

Col. 22, line 12, "method" should read --method comprises the--

Col. 23, line 39, "diagnosis" should read --diagnose--

Col. 28, line 47, "circuits" should read --circuit--

UNITED STATES PATENT AND TRADEMARK OFFICE
CERTIFICATE OF CORRECTION

PATENT NO. : 5,481,548

DATED : January 2, 1996

INVENTOR(S) : J. Ligthsey Wallace

It is certified that error appears in the above-indentified patent and that said Letters Patent is hereby corrected as shown below:

Col. 22, line 12, "method" should read --method comprises the --.

Col. 23, line 39, "diagnosis" should read --diagnose--.

Col. 28, line 47, "circuits" should read --circuit--.

Signed and Sealed this

Sixth Day of August, 1996

Attest:

BRUCE LEHMAN

*Attesting Officer*     *Commissioner of Patents and Trademarks*